US012125349B2

(12) United States Patent
Tam et al.

(10) Patent No.: US 12,125,349 B2
(45) Date of Patent: *Oct. 22, 2024

(54) ELECTRONIC GAMING MACHINE AND METHOD FOR PROVIDING AN AWARD BASED UPON A PRIZE CATEGORY AND A PRIZE SUB-CATEGORY

(71) Applicant: Aristocrat Technologies Australia Pty Limited, North Ryde (AU)

(72) Inventors: Billy Tam, Lindfield (AU); Lipi Gupta, Newington (AU); Matthew Chan, Gordon (AU); Hiram Yu, Mortdale (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,370

(22) Filed: Feb. 13, 2023

(65) Prior Publication Data

US 2023/0196879 A1 Jun. 22, 2023

Related U.S. Application Data

(63) Continuation of application No. 17/371,982, filed on Jul. 9, 2021, now Pat. No. 11,594,108, which is a (Continued)

(30) Foreign Application Priority Data

Aug. 13, 2018 (AU) ................................ 2018902951
Jun. 26, 2019 (AU) ................................ 2019204530

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/3213; G07F 17/3267; G07F 17/34
(Continued)

(56) References Cited

U.S. PATENT DOCUMENTS 4,240,213 A 12/1980 Lutin
5,909,875 A 6/1999 Weingardt
(Continued)

FOREIGN PATENT DOCUMENTS

AU 2015215899 A1 9/2015
CN 102939138 A 2/2013
(Continued)

OTHER PUBLICATIONS

Notice of Allowance dated Mar. 26, 2021 for U.S. Appl. No. 16/537,938 (pp. 1-10).
(Continued)

*Primary Examiner* — Michael A Cuff
(74) *Attorney, Agent, or Firm* — Armstrong Teasdale LLP

(57) ABSTRACT

An electronic gaming machine includes a processor configured to control display of a plurality of columns of symbol positions, where each column of symbol positions includes a plurality of symbols. The processor is also configured to select the symbols for each column and simulate display of the first reel strip stopping prior to simulating display of the second reel strip stopping, whereby a sub-category of prize associated with a prize sub-category symbol is indicated to a player of the electronic gaming machine prior to indicating a category of prize associated with a prize category symbol. The processor is also configured to determine whether a first column includes the prize sub-category symbol as well as whether a second column includes the prize category sym-
(Continued)

bol. If the prize sub-category and prize category symbols are included, the processor is also configured to provide an award.

20 Claims, 12 Drawing Sheets

Related U.S. Application Data continuation of application No. 16/537,938, filed on Aug. 12, 2019, now Pat. No. 11,062,568.

(58) Field of Classification Search
USPC .................................................. 463/20
See application file for complete search history.

(56) References Cited

U.S. PATENT DOCUMENTS

| | | | |
|---|---|---|---|
| 6,036,190 A | 3/2000 | Edmunds | |
| 6,270,408 B1 * | 8/2001 | Sakamoto | G07F 17/32 463/20 |
| 6,935,947 B1 | 8/2005 | Singer | |
| 8,387,985 B1 | 3/2013 | Itkis | |
| 10,522,005 B2 | 12/2019 | Wortmann | |
| 2002/0190469 A1 | 12/2002 | Conklin | |
| 2003/0013517 A1 * | 1/2003 | Bennett | G07F 17/34 463/25 |
| 2003/0222402 A1 | 12/2003 | Olive | |
| 2003/0228899 A1 | 12/2003 | Evans | |
| 2004/0033829 A1 | 2/2004 | Pacey | |
| 2004/0033831 A1 | 2/2004 | Tarantino | |
| 2004/0048646 A1 | 3/2004 | Visocnik | |
| 2004/0131239 A1 | 7/2004 | Shahar | |
| 2005/0026676 A1 | 2/2005 | Olive | |
| 2005/0051962 A1 | 3/2005 | Chapman | |
| 2008/0167113 A1 * | 7/2008 | Plowman | G07F 17/3262 463/43 |
| 2008/0303207 A1 | 12/2008 | Snow | |
| 2009/0111570 A1 | 4/2009 | Yoshizawa | |
| 2010/0056241 A1 | 3/2010 | Acres | |
| 2010/0317421 A1 | 12/2010 | Kirkutis | |
| 2011/0118006 A1 | 5/2011 | Acres | |
| 2011/0130198 A1 | 6/2011 | Van Linden | |
| 2011/0190043 A1 | 8/2011 | San | |
| 2014/0179399 A1 | 6/2014 | Lee | |
| 2016/0104344 A1 | 4/2016 | Meyer | |
| 2017/0039812 A1 | 2/2017 | Baron | |
| 2017/0092045 A1 | 3/2017 | Kitamura | |
| 2018/0286175 A1 | 10/2018 | Kuhlmann | |
| 2019/0051096 A1 | 2/2019 | San | |
| 2019/0130704 A1 | 5/2019 | Cormack | |
| 2019/0287336 A1 | 9/2019 | Prabhu | |

FOREIGN PATENT DOCUMENTS

| | | | |
|---|---|---|---|
| CN | 106504439 | A | 3/2017 |
| GB | 1014281 | | 12/1965 |
| GB | 1156061 | | 6/1969 |
| JP | 2000140284 | A | 5/2000 |
| JP | 2000185133 | A | 7/2000 |
| JP | 2004255209 | A | 9/2004 |
| JP | 2004283622 | A | 10/2004 |
| JP | 2004283623 | A | 10/2004 |
| JP | 2004283624 | A | 10/2004 |
| JP | 2010227396 | A | 10/2010 |
| WO | 0200314 | A1 | 1/2002 |
| WO | 2005016471 | A1 | 2/2005 |
| WO | 2009064680 | A1 | 5/2009 |

OTHER PUBLICATIONS

Office Action (Notice of Allowance and Fees Due (PTOL-85) dated Nov. 30, 2022 for U.S. Appl. No. 17/371,982 (pp. 1-5).

* cited by examiner

300

321 322 323 324 325

| | Reel position | Reel 1 | Reel 2 | Reel 3 | Reel 4 | Reel 5 |
|---|---|---|---|---|---|---|
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J | A | 10 | J | 9 |
| 312 | 12 | 10 | Wild | Wild | K | Q |
| 313 | 13 | Pic 3 | K | A | Wild | 10 |
| 314 | 14 | Wild | J | A | Pic 3 | Wild |
| 315 | 15 | 9 | 10 | Wild | Pic 1 | A |

331

343 342 341

*FIG. 3*

FIG. 8
$3,000.00
GRAND
JACKPOT
$500.01
MAJOR
JACKPOT
$50
GRAND
BONUS
$10
MAJOR
BONUS
5 DRAGONS REIGN
MAJOR
JACKPOT
800
702A
705D
705E
705F
703A

FIG. 9
$3,000.00
GRAND
JACKPOT
$500.00
MAJOR
JACKPOT
$50
GRAND
BONUS
$10
MAJOR
BONUS
5 DRAGONS REIGN
MAJOR
BONUS
900
702B
705G
705H
705I
704B

FIG. 10
$3,000.01
GRAND
JACKPOT
$500.04
MAJOR
JACKPOT
$250
GRAND
BONUS
$50
MAJOR
BONUS
5 DRAGONS
REIGN
MAJOR
702C

ELECTRONIC GAMING MACHINE AND METHOD FOR PROVIDING AN AWARD BASED UPON A PRIZE CATEGORY AND A PRIZE SUB-CATEGORY

CROSS-REFERENCE TO RELATED APPLICATIONS

This application is a continuation of and claims priority to U.S. patent application Ser. No. 17/371,982, filed Jul. 9, 2021, which is a continuation of U.S. patent application Ser. No. 16/537,938, now U.S. Pat. No. 11,062,568, filed Aug. 12, 2019, which claims priority to Australian Patent Application Serial No. 2019204530, filed Jun. 26, 2019, which claims priority to Australian Provisional Patent Application Serial No. 2018902951, filed Aug. 13, 2018, each of which is incorporated by reference herein in its entirety.

FIELD

The present application relates to electronic gaming, and more particularly to systems and methods of electronic gaming, in which an award or prize is provided to a player based upon a combination of one or more prize category symbols and one or more prize sub-category symbols.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In an embodiment of the present disclosure, a gaming device is configured to have a number of different sub-category symbols on a first reel and a number of different category symbols on a second reel. If both a sub-category and a category symbol are selected, a prize is awarded based on the combination of sub-category and category identified by the symbols.

An embodiment provides a gaming device comprising a processor, a plurality of reel strips including a first reel strip comprising a plurality of symbols including a plurality of different prize sub-category symbols and a second reel strip comprising a plurality of symbols including a plurality of different prize category symbols, and a memory storing instructions. When the instructions are executed by the processor, they cause the processor to select symbols from the plurality of reel strips for respective ones of a plurality of columns of symbol positions, and upon the selected symbols of the first reel strip including a prize sub-category symbol and the selected symbols of the second reel strip including a prize category, make an award derived from both the prize sub-category and the prize category.

Another embodiment provides a method of operating a gaming device comprising a processor, and a plurality of reel strips including a first reel strip comprising a plurality of symbols including a plurality of different prize sub-category symbols and a second reel strip comprising a plurality of symbols including a plurality of different prize category symbols. The method comprises selecting symbols from the plurality of reel strips for respective ones of a plurality of columns of symbol positions, and upon the selected symbols of the first reel strip including a prize sub-category symbol and the selected symbols of the second reel strip including a prize category, making an award derived from both the prize sub-category and the prize category.

Another embodiment provides a gaming system comprising one or more processors, a plurality of reel strips including a first reel strip comprising a plurality of symbols including a plurality of different prize sub-category symbols and a second reel strip comprising a plurality of symbols including a plurality of different prize category symbols, and at least one memory storing instructions. When the instructions are executed by the one or more processors, cause the one or more processors to select symbols from the plurality of reel strips for respective ones of a plurality of columns of symbol positions, and upon the selected symbols of the first reel strip including a prize sub-category symbol and the selected symbols of the second reel strip including a prize category, making an award derived from both the prize sub-category and the prize category.

In some aspects, an embodiment provides an electronic gaming machine that includes a display device, a memory, and a processor configured to execute instructions stored in the memory, which when executed, cause the processor to at least: control the display device to display a plurality of columns of symbol positions, each column of symbol positions including a plurality of symbols selected from an associated reel strip of a plurality of reel strips; select the plurality of symbols for each column of symbol positions rom the associated reel strip; control the display device to simulate stopping the first reel strip prior to controlling the display device to simulate stopping the second reel strip, whereby a sub-category of prize associated with a prize sub-category symbol is indicated to a player of the electronic gaming machine prior to indicating a category of prize associated with a prize category symbol; determine whether a first column of the plurality of columns includes a prize sub-category symbol; determine whether a second column of the plurality of columns includes a prize category symbol; and in response to determining that the first column includes the prize sub-category symbol and that the second column includes the prize category symbol, provide an award based upon a combination of the prize sub-category symbol and the prize category symbol.

In some aspects, an embodiment provides an electronic gaming machine that includes a plurality of mechanical reels, each mechanical reel of the plurality of mechanical reels including a plurality of symbols, a memory, and a processor configured to execute instructions stored in the memory, which when executed, cause the processor to at least: control the plurality of mechanical reels to spin and stop, whereby one or more symbols are displayed from the plurality of symbols included on each mechanical reel; control the first mechanical reel to stop prior to any other mechanical reel of the plurality of mechanical reels being stopped, whereby a sub-category of prize associated with a prize sub-category symbol is indicated to a player of the electronic gaming machine prior to indicating a category of prize associated with a prize category symbol; determine whether a prize sub-category symbol is displayed from a first mechanical reel of the plurality of mechanical reels; determine whether a prize category symbol is displayed form a second mechanical reel of the plurality of mechanical reels; and in response to determining that the prize sub-category symbol is displayed from the first mechanical reel and that the prize category symbol is displayed from the second mechanical reel, provide an award based upon a combination of the prize sub-category symbol and the prize category symbol.

In some aspects, an embodiment provides a method. The method includes: controlling, by a processor, a display device to display a plurality of columns of symbol positions, each column of symbol positions including a plurality of symbols selected from an associated reel strip of a plurality of reel strips; selecting, by the processor, the plurality of symbols for each column of symbol positions from the associated reel strip; controlling, by the processor, the display device to simulate stopping the first reel strip prior to controlling the display device to simulate stopping the second reel strip, whereby a sub-category of prize associated with a prize sub-category symbol is indicated to a player of the electronic gaming machine prior to indicating a category of prize associated with a prize category symbol; determining, by the processor, whether a first column of the plurality of columns includes a prize sub-category symbol; determining, by the processor, whether a second column of the plurality of columns includes a prize category symbol; and in response to determining that the first column includes the prize sub-category symbol and that the second column includes the prize category symbol, providing, by the processor, an award based upon a combination of the prize sub-category symbol and the prize category symbol.

BRIEF DESCRIPTION OF THE DRAWINGS

FIG. 3 illustrates an example reel strip layout.

DETAILED DESCRIPTION

Figure 1:
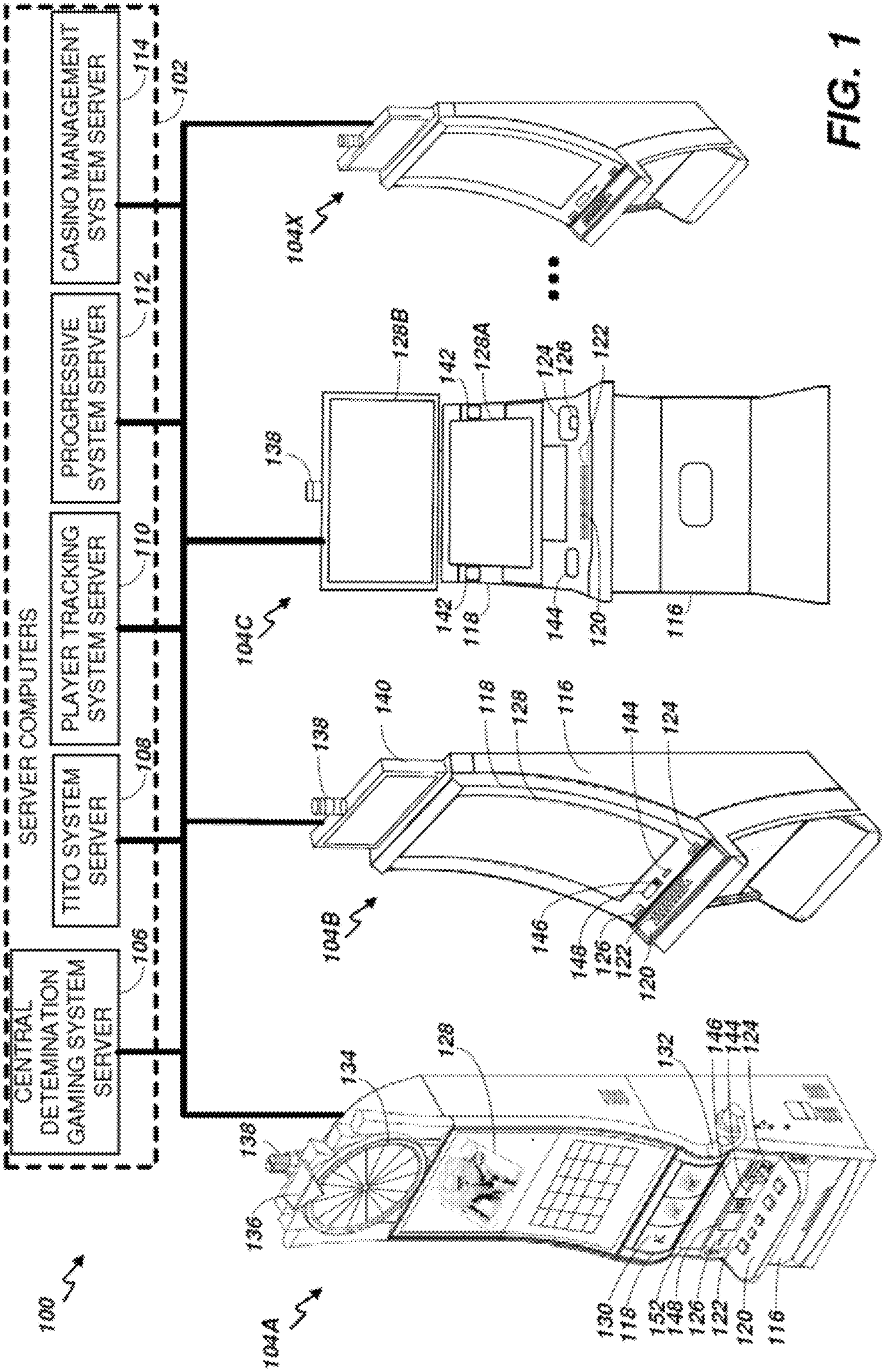
FIG. 1 is an exemplary diagram showing several EGMs networked with various gaming related servers.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
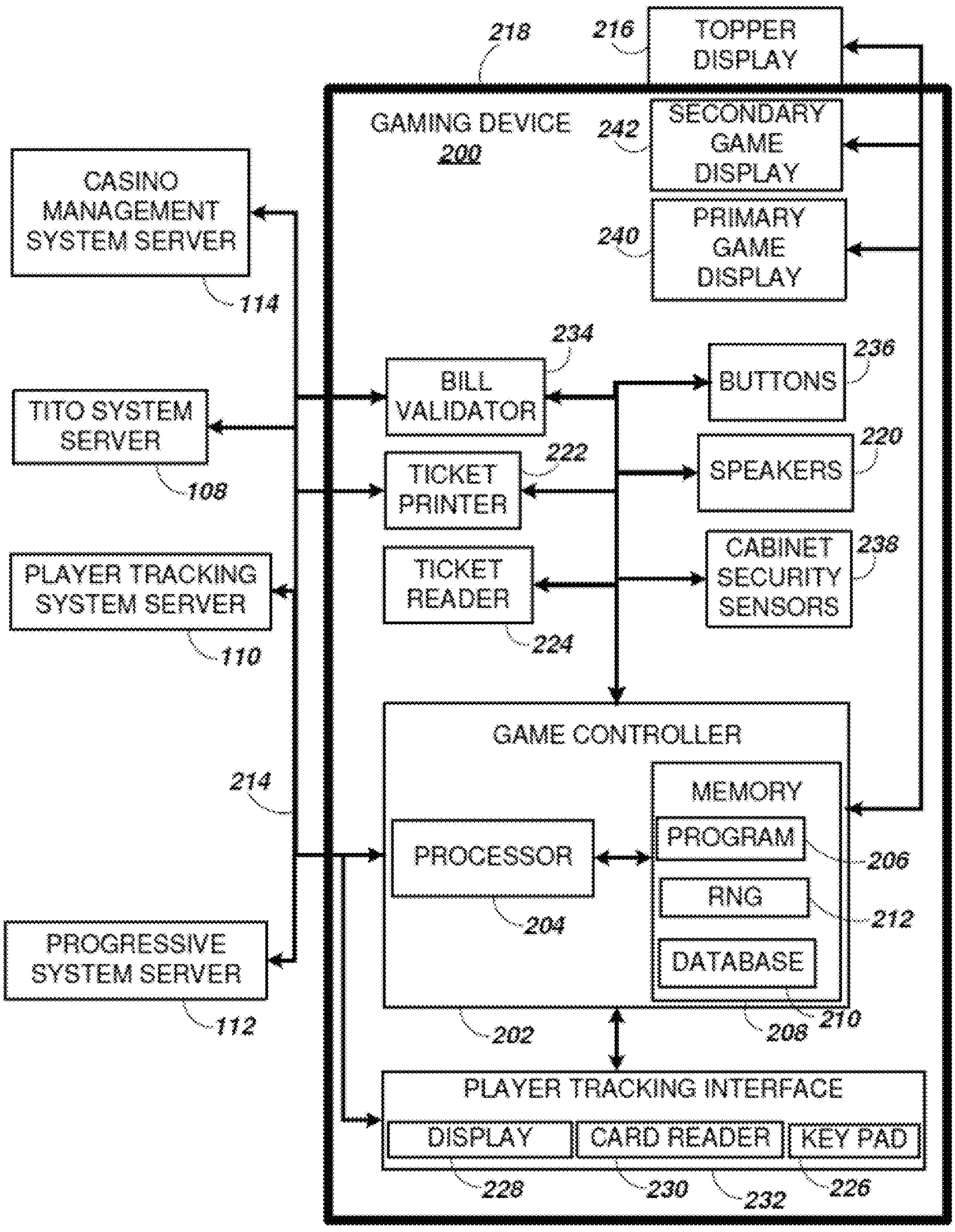
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines. Selecting a number of pay lines to play is only one example of a player selection. In another example employed in the embodiment described below, the player selects a number of reels to play as well as a number of reels to be activated for an additional feature.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
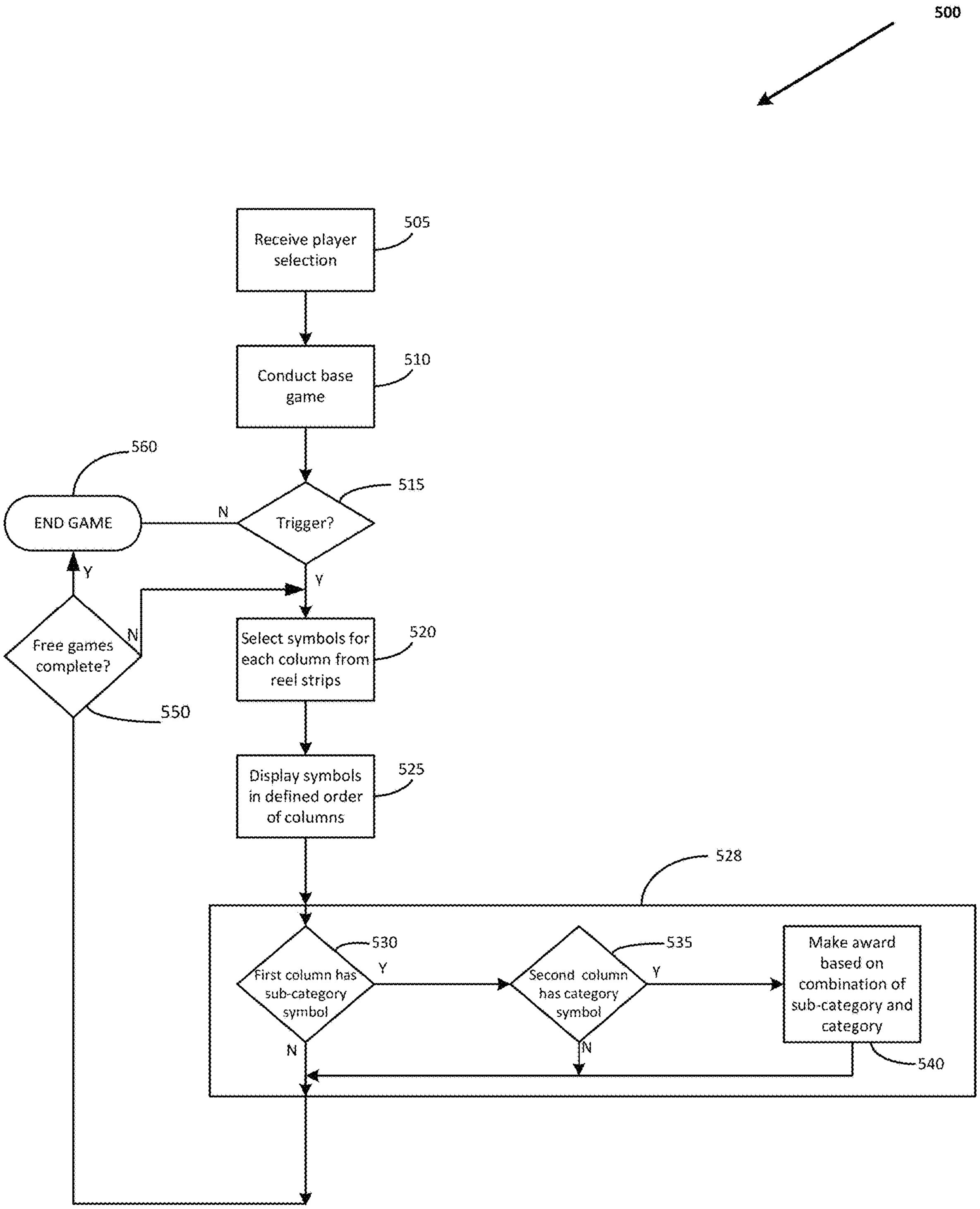
FIG. 5 is a flow chart of a method of operating a gaming machine.

FIG. 5 is a flowchart of a method 500 of operating a gaming device of an embodiment. At step 505, the processor 204 receives a player selection in respect of play of the game offered by the gaming device that the player has input via an input device such as buttons 236. For example, a number of pay lines to play and an amount to wager per line.

In one example, the base game is a spinning reel game conducted with five spinning reels where three symbols are selected from each reel strip for display in a rectangular array of symbol positions.

At step 510, the processor 204 conducts the base game of the game by selecting symbols for the base game and evaluating them for winning combinations. FIG. 3 illustrates an example of a set 300 of five reel strips 321, 322, 323, 324, 325. In the example, each reel strip has fifteen reel strip positions 301-315. Each reel strip position of each reel has a symbol. For example, a "Wild" symbol 331 occupies the sixth reel strip position 306 of the fourth reel 324. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the reel strips would depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
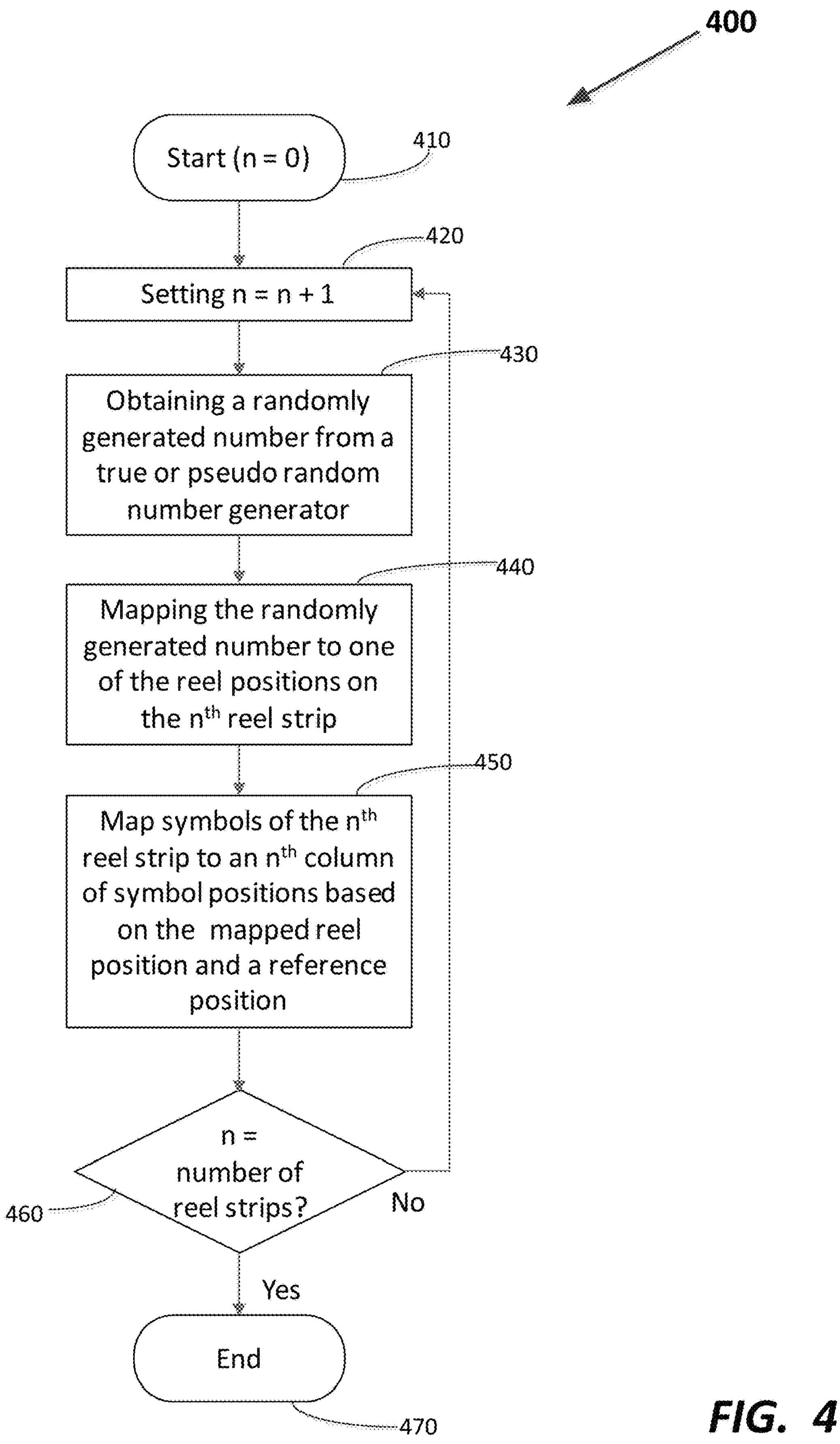
FIG. 4 is a flow chart of a symbol selection method.

FIG. 4 is a flow chart of an example of a method 400 that can be carried out by the processor 204 to select symbols from reel strips at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the $n^{th}$ reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic3" symbol 343 is mapped to a bottom symbol position, "10" symbol 342 is mapped to a middle symbol position, and "J" symbol is mapped to a top symbol position.

At step 460, the processor 206 determines whether symbols have been selected for all of the reel strips, and, if not, the processor reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol positions, the processor 204 controls display 240 to display them at the symbol positions.

The processor 204 evaluates the symbols at the symbol positions based on the player selections and a pay table (or "paytable") in memory 208 to determine whether there are any winning combinations of symbols and the quantum of the award for any winning combination. The processor adds any award to a win meter in memory 208.

In some embodiments, the paytable in memory 208 is a customized paytable that associated a plurality of prizes or awards with different combinations, as described herein, of prize category and prize sub-category symbols. The customized paytable may facilitate many of the specific technical improvements described herein. For example, to facilitate awards or prizes based upon combinations of prize sub-category and prize category, as well as to facilitate providing an indication of a prize sub-category prior to providing an indication of prize category, the customized paytable may be implemented in hardware and/or software to enable these features. At step 515, the processor 204 also evaluates the symbols to determine whether a trigger condition is met. In an embodiment, the trigger condition is three or more scatter symbols being selected for the symbol positions. Other trigger mechanisms known in the art may also be used such as the applicant's HYPERLINK™ trigger. If a trigger condition is not met, the processor ends the game 560.

Upon a trigger condition being met, a feature game is initiated by the processor 204 in which a game instance is conducted from which a player may win a jackpot or bonus prize. That is, an additional game instance is generated and evaluated without a player making a further wager.

At step 520, the processor 204 selects symbols from a set of reel strips stored in memory 208 for display in a plurality of columns of symbol positions. In the example, there are five columns each having three symbol positions and symbols are selected from five reel strips associated with respective ones of the columns. Symbols are selected by the processor 204 using the method described in relation to FIGS. 3 and 4, however, the reels strips are modified relative to those of the base game. In one example, the sub-category symbols "Grand", "Major", "Mini", and "Minor" are added to a first reel strip (advantageously, the first or left most reel strip so that they can be selected for a first column), while the category symbols "Jackpot" and "Bonus" are added to a second reel strip (advantageously, the fifth or right most reel strip). Thus, the sub-category symbol indicates the sub-category of award that applies and the category symbol indicates the category of award that applies. In one example, the modified reel strips are provided by storing a separate set of reel strips in memory 208 that are used in the feature game. An advantage and/or specific technical improvement of embodiments of the disclosure is that two or more different prizes can be awarded for winning combinations featuring the same symbol.

At step 525, the processor 204 controls electronic display 240 to simulate spinning of the reel strips. The processor 204 spins the respective reels to a stop in a defined order, in this example from left to right. As a result, the player knows what sub-category they may potentially win before the category.

In view of the foregoing, one technical improvement embodied by the present wagering game is therefore that presentation of a sub-category symbol (indicating a sub-category of prize or award) prior to presentation of a category symbol (indicating an overarching prize category) may build suspense and anticipation during the wagering game. For example, a player may experience increased anticipation and excitement as a result of a "Grand" sub-category symbol occurring, in that the player may see, from a progressive meter displayed near or on the player's EGM 104A-104X, that a Grand progressive jackpot has reached a very high amount. In other words, when a Grand progressive is very high (and from a player perspective "ready" to hit), the player may experience increased excitement when the Grand sub-category symbol lands prior to an indication whether the progressive is selected for an award determination (e.g., by a Jackpot category symbol) or a fixed bonus prize is selected for the award determination (e.g., by a Bonus category symbol).

Another specific technical improvement achieved by the present disclosure is that presentation of a sub-category symbol in a first or leftmost reel, as described herein, better informs a player that there is a chance to win a prize coming up (e.g., depending upon whether and which category symbol lands, if any, on a subsequent, or rightmost, reel).

In this example, all eight possible prize amounts are displayed on display 240. That is, display 240 shows 8 prizes: 4 Jackpots and 4 Bonuses. Jackpot amounts are progressive and accumulate through play while Bonus amounts are fixed and based on the chosen bet denomination of the player selections 505.

At step 528, the processor 204 evaluates the selected symbols to determine whether to make an award. In one example, evaluation of the selected symbols includes at step 530 the processor 204 determining whether the first column of symbol positions has a selected sub-category symbol and if it does, at step 535 determining whether a second column of symbol positions (here the fifth column/reel) has a category symbol. If it does, at step 540, the processor 204 makes an award based on the combination of sub-category and category identified by the respective symbols.

Thus, for example, if the player lands a Grand symbol from the first reel strip and Bonus symbol from the fifth reel, then the player wins the Grand Bonus prize, the value of which is shown on the display.

After the processor 204 evaluates the selected symbols, the processor proceeds to step 550 and determines whether there are any further free games. If there are, the processor reverts to step 520, otherwise the processor 204 ends the game at step 560.

In another example, step 528 includes the processor 204 additionally evaluating the selected symbol for other winning combinations based on player selections and a pay table in memory 208. In another example, step 528 includes evaluating the selected symbols for other winning combinations based on player selections and a pay table in memory only upon no award being made by the processor 204 based on a combination of a sub-category symbol and a category symbol.

In another example, the additional game instance may be one of a series of game instances initiated by the processor 204. That is, the player may have multiple opportunities to win a prize formed by the combination of a category and sub-category symbol.

In another example, there may be multiple instances of each sub-category symbol and/or category symbol on their respective reel strips.

In another example, the reel strips employed sub-category symbols and category symbols can be employed in a base game.

In another example, the reel strips may be provided on mechanical reels. In such an example, the processor can select the symbols in essentially the same manner as described above in relation to FIGS. 3 & 4 as once a stopping position is selected for a mechanical reel, the fixed nature of the symbols relative to the reel will control which symbols are displayed once spinning of the reels stops.

In another example, the feature game may be one of a plurality of feature games, each triggered by different trigger conditions being met in respect of the base game.

Figure 6:
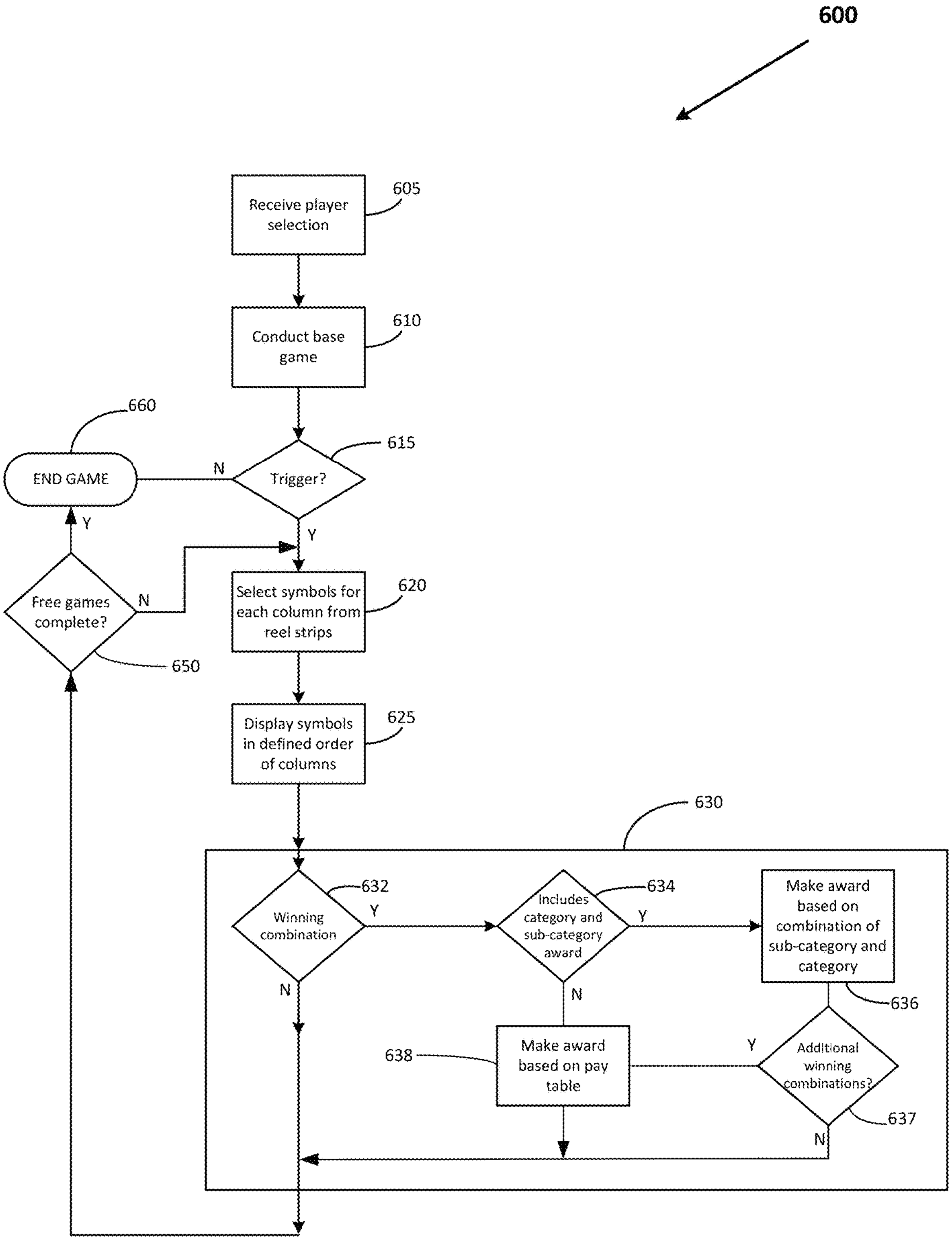
FIG. 6 is a flow chart of another method of operating a gaming machine.

FIG. 6 show an alternative method 600 of operating a gaming device in accordance with the present disclosure. In this example, an award is made of an amount based on the prize sub-category symbol and the prize category symbol when the prize sub-category symbol and the prize category symbol feature in a winning combination. In an example, the category of each category symbol is stored as part of the reel strip data in memory and when a category symbol is selected, the category symbol is animated to show at least one other category prior to displaying the stored category of the category symbol.

Similar to FIG. 5 at step 605, the processor 204 receives a player selection in respect of play of the game offered by the gaming device that the player has input via an input device such as buttons 236. For example, a number of pay lines to play and an amount to wager per line.

In one example, the base game is a spinning reel game conducted with five spinning reels where three symbols are selected from each reel strip for display in a rectangular array of symbol positions.

At step 610, the processor 204 conducts the base game of the game by selecting symbols for the base game and evaluating them for winning combinations. In the example of FIG. 6 symbols are selected from the set 300 of five reel strips 321, 322, 323, 324, 325 shown in FIG. 3 using the method 400 of FIG. 4.

The processor 204 evaluates the symbols at the symbol positions based on the player selections and a pay table in memory 208 to determine whether there are any winning combinations of symbols and the quantum of the award for any winning combination. The processor adds any award to a win meter in memory 208.

At step 615, the processor 204 also evaluates the symbols to determine whether a trigger condition is met. In an embodiment, the trigger condition is three or more scatter symbols being selected for the symbol positions. Other trigger mechanisms known in the art may also be used. If a trigger condition is not met, the processor 204 ends the game at step 660.

Upon a trigger condition being met, a feature game is initiated by the processor 204 in which a game instance is conducted from which a player may win a jackpot or bonus prize. That is, an additional game instance is generated and evaluated without a player making a further wager.

FIGS. 7 to 12 are example screen displays of the graphical user interface of the gaming device 200 during the feature game. At step 620, the processor 204 selects symbols from a set of reel strips stored in memory 208 for display in a plurality of columns of symbol positions. In the example, there are there are five columns 711-715 of symbol positions each having three symbol positions and symbols are selected from five reel strips associated with respective ones of the columns. Symbols are selected by the processor 204 using the method described in relation to FIGS. 3 and 4, however, the reels strips are modified relative to those of the base game.

In this example, the sub-category symbols "Grand" 701 and "Major" 702 are added to the left first reel strip (advantageously, the first or left most reel strip so that they can be selected for a first column), while the category symbols "Jackpot" 703 and "Bonus" 704 are added to a second reel strip (advantageously, the fifth or right most reel strip). Again, the sub-category symbol indicates the sub-category of award that applies and the category symbol indicates the category of award that applies.

Figure 7:
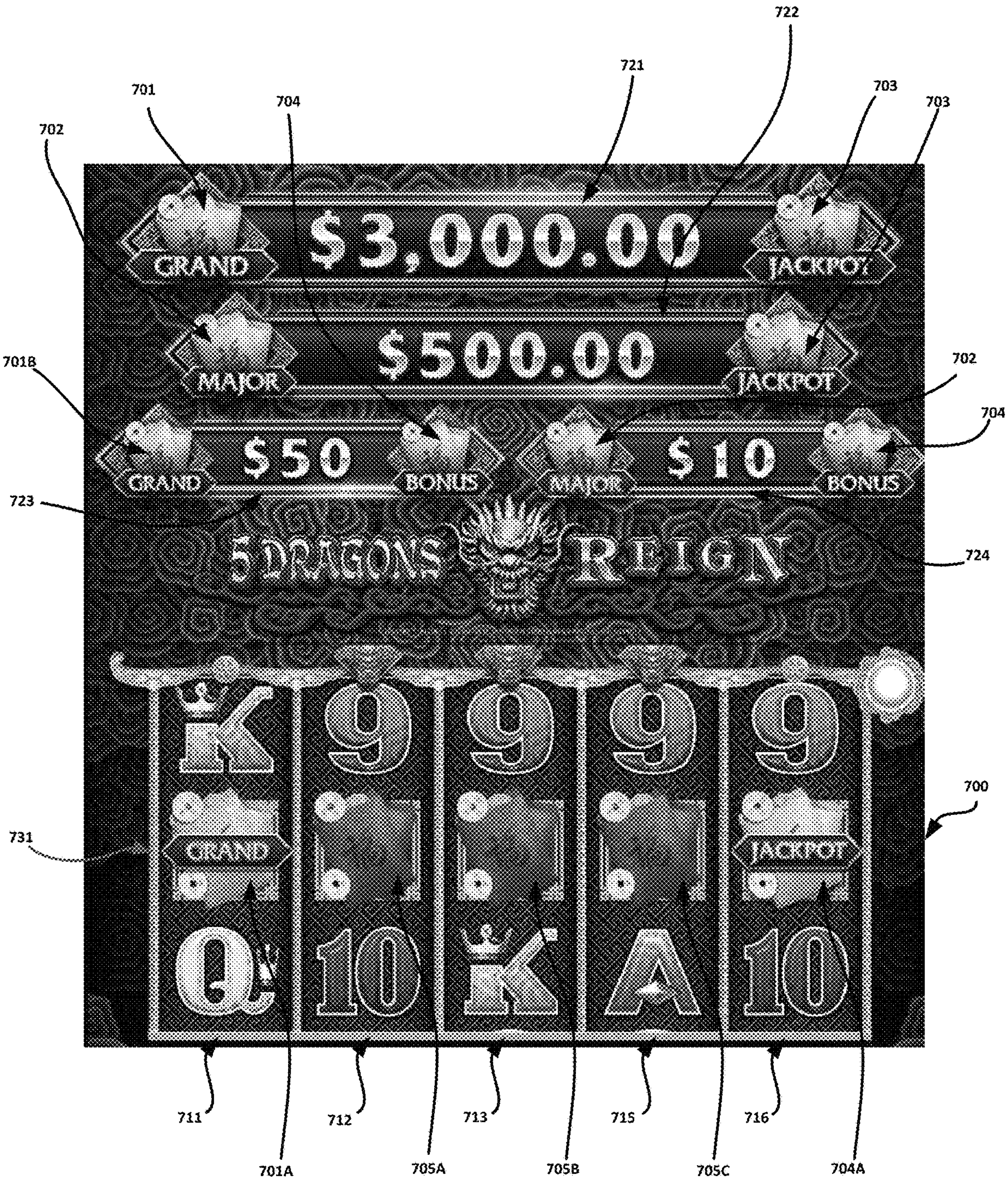
FIGS. 7 to 12 are example screen displays.

Referring, for example, to FIG. 7, above the symbol positions, there are four prize indicators 721-724 showing values of four prizes. The combination of the category to the right of the prize indicator and the sub-category symbol to the left of the prize indicator indicates to the player what prize they are entitled to. For example, prize indicator 721 for the value of $3000.00 incorporates the Grand 701 and Jackpot 703 symbols, indicating the prize is the Grand Jackpot prize. Accordingly, an aspect of the graphical interface shown in FIGS. 7-12 is that a player can readily see the relationship between prize symbols selected for the symbol positions and the prizes.

At step 625, the processor 204 controls electronic display 240 to simulate spinning of the reel strips. The processor 204 spins the respective reels to a stop in a defined order, in this example from left to right. As a result, the player knows what sub-category they may potentially win before the category.

In this example, Jackpot amounts 721, 722 are progressive prizes and accumulate through play while Bonus amounts 723, 724 are fixed and based on the chosen bet denomination of the player selections 605.

At step 630 the processor 204 evaluates the selected symbols to determine whether to make one or more awards. As indicated above, in this embodiment, one of prizes 721-724 is awarded if the category and sub-category symbols form part of a winning combination. In this example, the winning combination needs to incorporate Red Packet symbols 705. In this example, the winning combination is a five-of-a-kind Packet symbol combination on an active win line. In other examples, the winning combination could be instead, or additionally, four- or three-of-a-kind (for example, if the category/sub-category symbols are reels strips associated with different columns). In another example, a winning combination could be a defined number of scatter symbols so that it does not have to be on an active win line.

In one example, evaluation of the selected symbols includes, at step 632, the processor 204 determining whether there are any winning combinations. If there are no winning combinations, the processor proceeds to step 650 and determines whether there are any further free games. If there are, the processor reverts to step 620, otherwise the processor 204 ends the game at step 660. If there is a winning combination, at step 634 processor 204 determines whether there is a winning combination that includes both a category symbol and a sub-category symbol. If there is such a winning combination, at step 636, the processor 204 makes an award based on the combination of sub-category and category identified by the respective symbols.

Thus, for example, if as shown in the example screen display 700 of FIG. 7 the player lands, on the middle win line 721, a Grand symbol 701A from the first reel strip and Bonus symbol 702A from the fifth reel in combination with three Red Packet symbols 705A-705C, then the player wins the Grand Bonus prize 723.

At step 637 the processor 204 determines whether there are any other winning combinations, and if so, the processor 204 proceeds to step 638 and makes awards for winning combinations based on player selections and a pay table in memory 208.

If at step 634 processor 204 determines there is no winning combination that includes both a category symbol and a sub-category symbol, processor 204 proceeds to step 638 and makes awards for winning combinations based on player selections and a pay table in memory 208. After the evaluation step is complete, the game ends 660.

In another example, step 630 involves evaluating the selected symbols for other winning combinations based on player selections and a pay table in memory only upon no award being made by the processor 204 based on a combination of a sub-category symbol and a category symbol.

Figure 8:

As indicated above, other prizes can be awarded, for example FIG. 8 shows an example screen display 800 of a graphical user interface where a player is awarded Major Jackpot prize from the combination of, Major sub-category symbol 702A, Jackpot category symbol 703A and three red packet symbols 705D-705F.

Figure 9:

FIG. 9 shows an example screen display 900 of a graphical user interface where a player is awarded Major Bonus prize from the combination of, Major sub-category symbol 702B, Jackpot category symbol 704B and three red packet symbols 705G-7051.

Figure 10:

FIG. 10 shows a non-winning example, where the processor 204 has only selected a Major sub-category symbol 702C.

Figure 11:
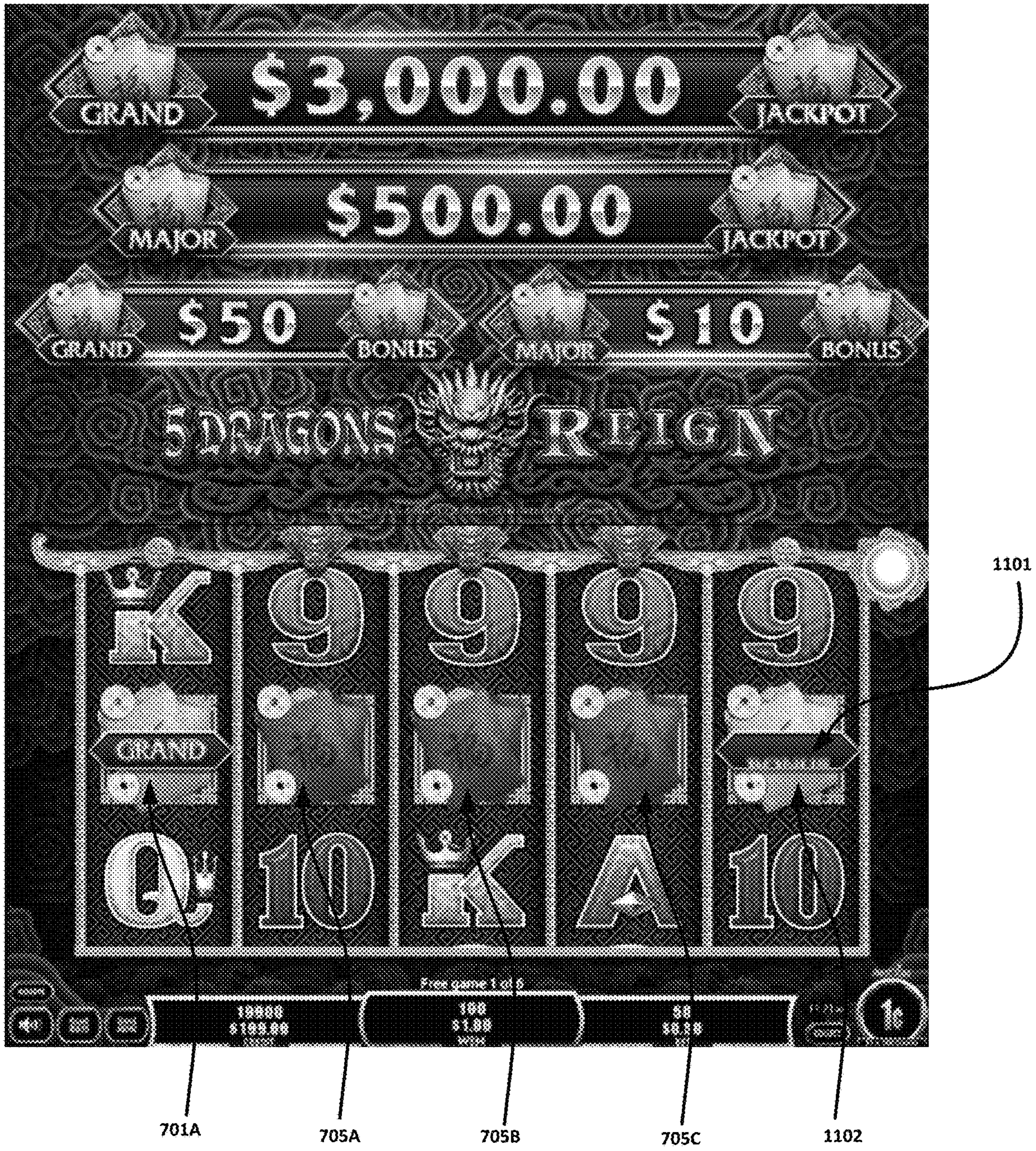
Figure 12:
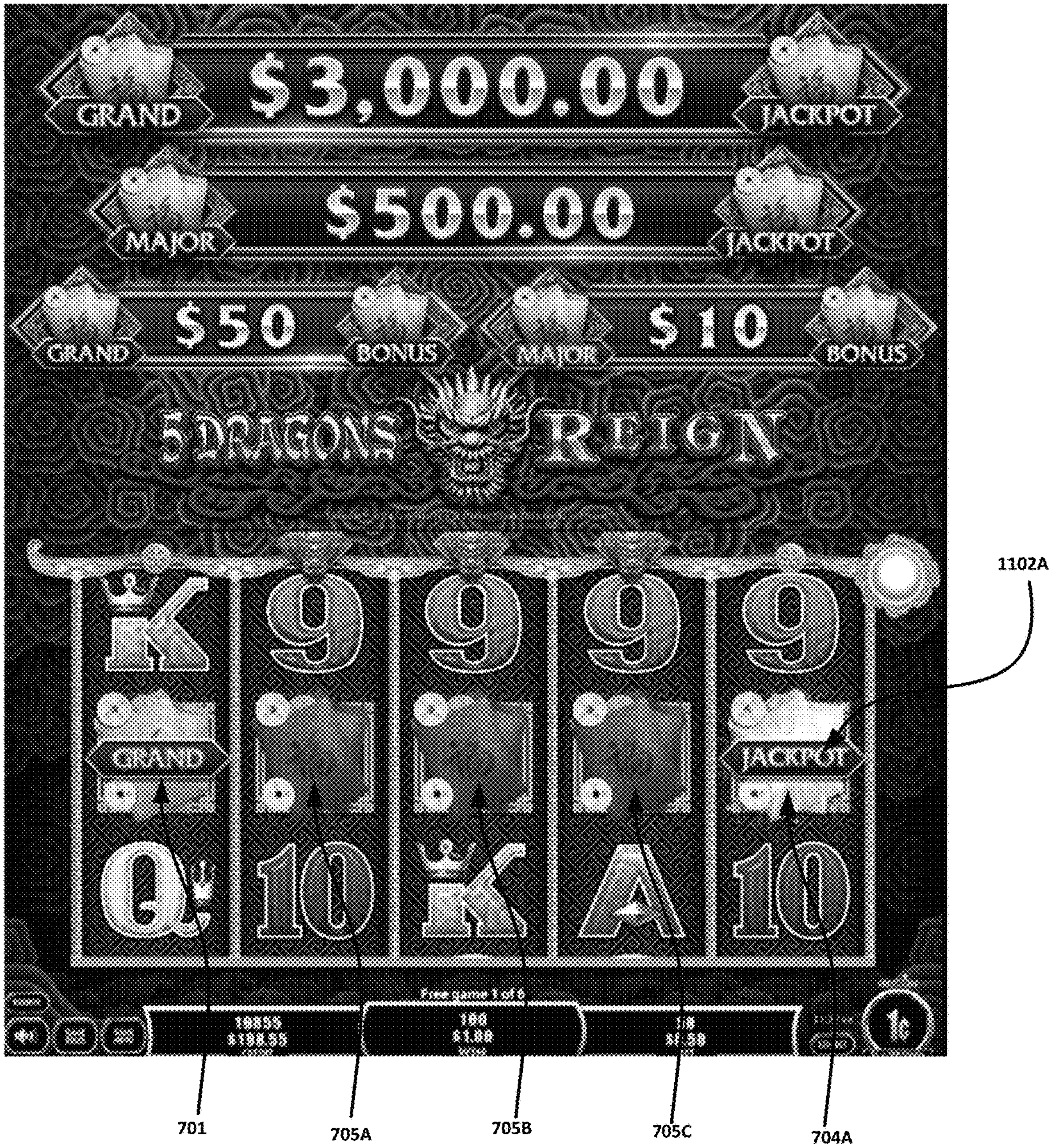

FIGS. 11 and 12 illustrate how an animation effect can be added to increase suspense prior to the winning combination shown in FIG. 7 being displayed. As shown in FIG. 11, Grand sub-category symbol 701A has landed, as have the three Red Packet symbols 705A-705C. Gold background 1102 indicates that a category symbol has landed. While, the category symbol that has been selected is determined based on the selection from the relevant reel strip, the name area 1101 is animated as spinning to build additional suspense. When the spinning stops, the category is revealed as shown in FIG. 12 which shows a reveal version of the category symbol 704AI with an animated background 1102A.

In another example, the category of any selected category symbol is randomly determined. In another example, the sub-category of any selected sub-category symbol is randomly determined. In another example, the sub-category of any selected sub-category symbol is animated to show at least one other sub-category prior to displaying the stored sub-category of the sub-category symbol.

An example embodiment provides a gaming device comprising:

a processor;

a plurality of reel strips including a first reel strip comprising a plurality of symbols including a plurality of different prize sub-category symbols and a second reel strip comprising a plurality of symbols including a plurality of different prize category symbols; and a memory storing instructions which when executed by the processor, cause the processor to:

select symbols from the plurality of reel strips for respective ones of a plurality of columns of symbol positions; and upon the selected symbols of the first reel strip including a prize sub-category symbol and the selected symbols of the second reel strip including a prize category, making an award derived from both the prize sub-category and the prize category.

In an example embodiment, when the instructions are executed by the processor, they cause the processor to control selection of the symbols such that symbols selected from the first reel strip are displayed at their respective symbol positions before symbols selected from the second reel strip.

In an example embodiment, when the instructions are executed by the processor, they cause the processor to spin respective reels to a stop in a defined order.

In an example embodiment, when the instructions are executed by the processor, they cause the processor to spin the respective reels to a stop from left to right.

In an example embodiment, there are five reel strips and five columns of symbol positions.

In an example embodiment, the first reel strip corresponds to a left most column of symbol positions and the second reel strip corresponds to a right most column of symbol positions.

In an example embodiment, the reel strips are provided on mechanical reels.

In an example embodiment, the gaming device comprises an electronic display, the reel strips are virtual reel strips stored in the memory, and the processor controls the electronic display to simulate spinning of the reel strips.

In an example embodiment, when the instructions are executed by the processor, they cause the processor to select the symbols from the plurality of reel strips during a feature game triggered from a base game.

In another example, embodiment, there is provided a method of operating a gaming device comprising a processor, and a plurality of reel strips including a first reel strip comprising a plurality of symbols including a plurality of different prize sub-category symbols and a second reel strip comprising a plurality of symbols including a plurality of different prize category symbols, the method comprising:

selecting symbols from the plurality of reel strips for respective ones of a plurality of columns of symbol positions; and upon the selected symbols of the first reel strip including a prize sub-category symbol and the selected symbols of the second reel strip including a prize category, making an award derived from both the prize sub-category and the prize category.

In an example embodiment, the method comprises controlling selection of the symbols such that symbols selected from the first reel strip are displayed at their respective symbol positions before symbols selected from the second reel strip.

In an example embodiment, the method comprises spinning respective reels to a stop in a defined order.

In an example embodiment, the method comprises spinning the respective reels to a stop from left to right.

In an example embodiment, there are five reel strips and five columns of symbol positions.

In an example embodiment, the first reel strip corresponds to a left most column of symbol positions and the second reel strip corresponds to a right most column of symbol positions.

In an example embodiment, the reel strips provided on mechanical reels.

In an example embodiment, the gaming device comprises an electronic display, the reel strips are virtual reel strips stored in a memory of the gaming device, and the method comprises controlling the electronic display to simulate spinning of the reel strips.

Another example embodiment provides a gaming system comprising:

one or more processors;

a plurality of reel strips including a first reel strip comprising a plurality of symbols including a plurality of different prize sub-category symbols and a second reel strip comprising a plurality of symbols including a plurality of different prize category symbols; and at least one memory storing instructions which when executed by the one or more processors, cause the one or more processors to:

select symbols from the plurality of reel strips for respective ones of a plurality of columns of symbol positions; and upon the selected symbols of the first reel strip including a prize sub-category symbol and the selected symbols of the second reel strip including a prize category, making an award derived from both the prize sub-category and the prize category.

Another example embodiment provides computer program code which when executed implements the above method.

Another example embodiment provides a non-transitory computer readable medium comprising the computer program.

An example embodiment provides a gaming device comprising:

a processor;

a plurality of reel strips including a first reel strip comprising a plurality of symbols including a plurality of different prize sub-category symbols and a second reel strip comprising a plurality of symbols including a plurality of different prize category symbols; and a memory storing instructions which when executed by the processor, cause the processor to:

select symbols from the plurality of reel strips for display at respective ones of the plurality of columns of symbol positions; and upon the selected symbols corresponding to a winning combination that incorporates a prize sub-category symbol a prize category symbol, making an award identified by the combination of the prize sub-category and the prize category.

In an example embodiment, when the instructions are executed by the processor, they cause the processor to control selection of the symbols such that symbols selected from the first reel strip are displayed at their respective symbol positions before symbols selected from the second reel strip.

In an example embodiment, when the instructions are executed by the processor, they cause the processor to spin respective reels to a stop in a defined order.

In an example embodiment, when the instructions are executed by the processor, they cause the processor to spin the respective reels to a stop from left to right.

In an example embodiment, there are five reel strips and five columns of symbol positions.

In an example embodiment, the first reel strip corresponds to a left most column of symbol positions and the second reel strip corresponds to a right most column of symbol positions.

In an example embodiment, the gaming device comprises an electronic display, the reel strips are virtual reel strips stored in the memory, and the processor controls the electronic display to simulate spinning of the reel strips.

In an example embodiment, when a winning combination is selected, the instructions cause the processor to control the display to display an animation of the prize category symbol in which at least one other prize category is displayed prior to displaying the prize category of the selected symbol.

In an example embodiment, when the instructions are executed by the processor, they cause the processor to select the symbols from the plurality of reel strips during a feature game triggered from a base game.

In another example embodiment, there is provided a method of operating a gaming device comprising a processor, and a plurality of reel strips including a first reel strip comprising a plurality of symbols including a plurality of different prize sub-category symbols and a second reel strip comprising a plurality of symbols including a plurality of different prize category symbols, the method comprising:

selecting symbols from the plurality of reel strips for display at respective ones of a plurality of columns of symbol positions; and upon the selected symbols corresponding to a winning combination that incorporates a prize sub-category symbol a prize category symbol, making an award identified by the combination of the prize sub-category and the prize category.

In an example embodiment, the gaming device comprises an electronic display, the reel strips are virtual reel strips stored in the memory, and the method comprises controlling the electronic display to simulate spinning of the reel strips.

In an example embodiment, the method comprises, when a winning combination is selected, controlling the display to display an animation of the prize category symbol in which at least one other prize category is displayed prior to displaying the prize category of the selected symbol.

Another example embodiment provides a gaming system comprising:

one or more processors;

a plurality of reel strips including a first reel strip comprising a plurality of symbols including a plurality of different prize sub-category symbols and a second reel strip comprising a plurality of symbols including a plurality of different prize category symbols; and at least one memory storing instructions which when executed by the one or more processors, cause the one or more processors to:

select symbols from the plurality of reel strips for display at respective ones of the plurality of columns of symbol positions; and upon the selected symbols corresponding to a winning combination that incorporates a prize sub-category symbol a prize category symbol, making an award identified by the combination of the prize sub-category and the prize category.

In an example embodiment, the system comprises at least one electronic display, the reel strips are virtual reel strips stored in the memory, and the processor controls the at least one electronic display to simulate spinning of the reel strips.

In an example embodiment, when a winning combination is selected, the instructions cause the processor to control the at least one electronic display to display an animation of the prize category symbol in which at least one other prize category is displayed prior to displaying the prize category of the selected symbol.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

at least one memory with instructions stored thereon; and at least one processor in communication with the at least one memory, wherein the instructions, when executed by the at least one processor, cause the at least one processor to:

cause display of a first plurality of symbols in a first display area of a plurality of display areas, wherein the first plurality of symbols includes a first output identifier symbol associated with a first identifier and a first aspect of an output;

cause display of a second plurality of symbols in a second display area of the plurality of display areas, wherein the second plurality of symbols includes a second output identifier symbol associated with a second identifier and a second aspect of the output;

determine the output based at least in part on a paytable stored in the at least one memory, the first identifier, and the second identifier, wherein the paytable comprises different outputs associated with different combinations of identifiers associated with the first aspect of the output and the second aspect of the output; and cause the output to be provided.

2. The electronic gaming system of claim 1, wherein the instructions further cause the at least one processor to cause display of the first plurality of symbols and the second plurality of symbols based on at least one message received from at least one gaming server.

3. The electronic gaming system of claim 2, wherein at least one of the first plurality of symbols or the second plurality of symbols is selected by the at least one gaming server based at least in part on an output from a random number generator (RNG).

4. The electronic gaming system of claim 1, wherein the instructions further cause the at least one processor to determine the output further based at least in part on a third plurality of symbols displayed in a third display area, wherein the third plurality of symbols comprises the first plurality of symbols and the second plurality of symbols, and wherein the third display area comprises the first display area and the second display area.

5. The electronic gaming system of claim 1, wherein the instructions further cause the at least one processor to receive a message from at least one gaming server including the output based at least in part on the paytable.

6. The electronic gaming system of claim 1, wherein the instructions further cause the processor to cause the output to be provided by storing the output in a player account.

7. The electronic gaming system of claim 1, wherein first output identifier symbol comprises a prize sub-category symbol and is selected from a plurality of sub-prize category symbols, and wherein the second output identifier symbol comprises a prize category symbol and is selected from a plurality of prize category symbols.

8. At least one non-transitory computer-readable storage medium with instructions stored thereon that, in response to execution by at least one processor, cause the at least one processor to:

cause display of a first plurality of symbols in a first display area of a plurality of display areas, wherein the first plurality of symbols includes a first output identifier symbol associated with a first identifier and a first aspect of an output;

cause display of a second plurality of symbols in a second display area of the plurality of display areas, wherein the second plurality of symbols includes a second output identifier symbol associated with a second identifier and a second aspect of the output;

determine the output based at least in part on a paytable stored in the at least one non-transitory computer-readable storage medium, the first identifier, and the second identifier, wherein the paytable comprises different outputs associated with different combinations of identifiers associated with the first aspect of the output and the second aspect of the output; and cause the output to be provided.

9. The at least one non-transitory computer-readable storage medium of claim 8, wherein the instructions further cause the at least one processor to cause display of the first plurality of symbols and the second plurality of symbols by transmitting at least one message to a gaming device.

10. The at least one non-transitory computer-readable storage medium of claim 9, wherein at least one of the first plurality of symbols or the second plurality of symbols is selected based at least in part on an output from a random number generator (RNG).

11. The at least one non-transitory computer-readable storage medium of claim 8, wherein the instructions further cause the at least one processor to determine the output further based at least in part on a third plurality of symbols displayed in a third display area, wherein the third plurality of symbols comprises the first plurality of symbols and the second plurality of symbols, and wherein the third display area comprises the first display area and the second display area.

12. The at least one non-transitory computer-readable storage medium of claim 8, wherein the instructions further cause the at least one processor to transmit a message to a gaming device including the output based at least in part on the paytable.

13. The at least one non-transitory computer-readable storage medium of claim 8, wherein the instructions further cause the at least one processor to cause the output to be provided by storing the output in a player account.

14. The at least one non-transitory computer-readable storage medium of claim 8, wherein first output identifier symbol comprises a prize sub-category symbol and is selected from a plurality of sub-prize category symbols, and wherein the second output identifier symbol comprises a prize category symbol and is selected from a plurality of prize category symbols.

15. A method of electronic gaming implemented by at least one processor in communication with at least one memory, the method comprising:

causing display of a first plurality of symbols in a first display area of a plurality of display areas, wherein the first plurality of symbols includes a first output identifier symbol associated with a first identifier and a first aspect of an output;

causing display of a second plurality of symbols in a second display area of the plurality of display areas, wherein the second plurality of symbols includes a second output identifier symbol associated with a second identifier and a second aspect of the output;

determining the output based at least in part on a paytable stored in the at least one memory, the first identifier, and the second identifier, wherein the paytable comprises different outputs associated with different combinations of identifiers associated with the first aspect of the output and the second aspect of the output; and causing the output to be provided.

16. The method of claim 15, further comprising causing display of the first plurality of symbols and the second plurality of symbols by transmitting at least one message from a gaming server to a gaming device, wherein at least one of the first plurality of symbols or the second plurality of symbols is selected by the gaming server based at least in part on an output from a random number generator (RNG).

17. The method of claim 15, further comprising determining the output further based at least in part on a third plurality of symbols displayed in a third display area, wherein the third plurality of symbols comprises the first plurality of symbols and the second plurality of symbols, and wherein the third display area comprises the first display area and the second display area.

18. The method of claim 15, further comprising transmitting a message to a gaming device, wherein the message includes the output based at least in part on the paytable.

19. The method of claim 15, further comprising causing the output to be provided by storing the output in a player account.

20. The method of claim 15, wherein first output identifier symbol comprises a prize sub-category symbol and is selected from a plurality of sub-prize category symbols, and wherein the second output identifier symbol comprises a prize category symbol and is selected from a plurality of prize category symbols.

* * * * *